US006919422B2

(12) United States Patent
Gallucci et al.

(10) Patent No.: US 6,919,422 B2
(45) Date of Patent: Jul. 19, 2005

(54) POLYIMIDE RESIN WITH REDUCED MOLD DEPOSIT

(75) Inventors: Robert R Gallucci, Mt. Vernon, IN (US); Roy Ray Odle, Mt. Vernon, IN (US); William A. Kernick, III, Evansville, IN (US); Mark Alan Sanner, Newburgh, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/667,820

(22) Filed: Sep. 22, 2003

(65) Prior Publication Data

US 2004/0260055 A1 Dec. 23, 2004

Related U.S. Application Data

(60) Provisional application No. 60/480,164, filed on Jun. 20, 2003.

(51) Int. Cl.[7] .................. C08G 73/10; C08G 69/28; B32B 27/00
(52) U.S. Cl. .................. 528/353; 528/125; 528/126; 528/128; 528/170; 528/172; 528/173; 528/174; 528/176; 528/179; 528/183; 528/185; 528/188; 528/220; 528/229; 528/350; 528/351; 525/432; 525/436; 524/600; 524/606; 428/411.1; 428/473.5
(58) Field of Search .................. 528/125, 126, 528/128, 170, 172, 173, 174, 176, 179, 183, 185, 188, 220, 229, 350, 351, 353, 219, 171, 352; 525/432, 436; 524/600, 606; 428/411.1, 473.5

(56) References Cited

U.S. PATENT DOCUMENTS

| | | | |
|---|---|---|---|
| 2,991,273 A | 7/1961 | Heckelhammer | |
| 2,999,835 A | 9/1961 | Goldberg | |
| 3,028,365 A | 4/1962 | Schnell et al. | |
| 3,148,172 A | 9/1964 | Fox et al. | |
| 3,271,367 A | 9/1966 | Schnell et al. | |
| 3,271,368 A | 9/1966 | Goldberg et al. | |
| 3,803,085 A | 4/1974 | Takekoshi et al. | |
| 3,814,869 A | 6/1974 | DeLuca | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,905,942 A | 9/1975 | Takekoshi et al. | |
| 3,972,902 A | 8/1976 | Heath et al. | |
| 3,983,093 A | 9/1976 | Williams, III et al. | |
| 4,293,683 A | 10/1981 | Takekoshi et al. | |
| 4,324,882 A | 4/1982 | Takekoshi | |
| 4,417,044 A | * 11/1983 | Parekh | 528/179 |
| 4,443,591 A | 4/1984 | Schmidt et al. | |
| 4,455,410 A | 6/1984 | Giles, Jr. | |
| 4,508,861 A | 4/1985 | Avakian | |
| 4,675,366 A | * 6/1987 | Evans et al. | 525/435 |
| 4,910,288 A | 3/1990 | Dellacoletta | |
| 4,965,337 A | * 10/1990 | Peters et al. | 528/353 |
| 4,988,544 A | * 1/1991 | Cella et al. | 427/384 |
| 5,484,879 A | * 1/1996 | Buchanan et al. | 528/353 |
| 6,001,957 A | 12/1999 | Puyenbroek et al. | |
| 6,020,456 A | * 2/2000 | Brunelle et al. | 528/353 |
| 6,417,255 B1 | * 7/2002 | Penning et al. | 524/112 |
| 6,451,955 B1 | * 9/2002 | Hausladen et al. | 528/170 |

* cited by examiner

Primary Examiner—P. Hampton Hightower

(57) ABSTRACT

A polyimide composition and a process to prepare polyimide resins with reduced plate out and mold deposits is described. During resin molding operations the low plate out resins show a longer period of operation between cleaning of equipment leading to more efficient operation.

54 Claims, No Drawings

POLYIMIDE RESIN WITH REDUCED MOLD DEPOSIT

CROSS-REFERENCE TO RELATED APPLICATIONS

This application claims priority of U.S. Provisional Application Ser. No. 60/480,164, filed Jun. 20, 2003 which is incorporated herein by reference.

BACKGROUND OF THE INVENTION

Polyimides and particularly polyetherimides are known to be useful high performance polymers. Polyetherimides combine the high temperature characteristics of polyimides but still have sufficient melt processability to be easily formed by conventional molding techniques such as compression molding, gas assist molding, profile extrusion, thermoforming and injection molding. While the melt processability of polyetherimides has been very useful for forming parts, drawbacks have been seen regarding the build up of deposits on the equipment used to process the molten polymer and to form parts. This has been especially notable during the injection molding process. When molding, especially during prolonged molding operations, a deposit builds up on the processing equipment, for example in the mold itself. This build up is often referred to as plate out. Plate out can interfere with the proper operation of the melt processing equipment and can impair the performance and aesthetics of parts made by the process. As such these mold deposits must be periodically removed from the mold and equipment. This means shutting down the equipment and cleaning the mold, usually by hand. This exposes operators to potentially dangerous situations as well as causing a loss in production while the equipment and/or mold is being cleaned. Therefore, mold deposits accompanying the melt processing of polyetherimide resin present a problem.

In U.S. Pat. No. 4,910,288 Dellacoletta describes low molecular weight species in polyetherimide (PEI) resin arising from the use of a phthalic anhydride (PA) end capping agent and describes a process to reduce the low molecular weight species. In a phthalic anhydride capped polyetherimide made by reaction of bisphenol-A dianhydride with m-phenylenediamine (MPD) a low molecular weight species is formed by reaction of two moles of PA with one mole of MPD. This compound is phthalic anhydride meta-phenylene diamine imide (PAMI). PAMI is one of the main low molecular weight constituents of plate out found during molding of commercial polyetherimide products. While the use of the process of U.S. Pat. No. 4,910,288 reduces PAMI content, it is not eliminated, and PAMI is still present. In addition the manufacturing process taught in U.S. Pat. No. 4,910,288 is more complex and takes an inordinate period of time to complete. The longer process of U.S. Pat. No. 4,910,288 results in inefficient use of the very expensive equipment used to make the polyimide resin.

BRIEF DESCRIPTION OF THE INVENTION

We have found that a change in the polyimide resin and the process used to manufacture the resin can dramatically reduce and even eliminate mold deposits.

In one of its aspects the present invention comprises a process to prepare a polyimide comprising structural units of the formula

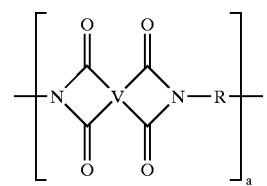

wherein "a" has a value of greater than 1, V is a tetravalent linker, and R is a substituted or unsubstituted divalent organic radical, which process comprises reacting an organic diamine monomer having a molecular weight from 100 to 500 with an aromatic dianhydride monomer with a molecular weight from 218 to 1000 wherein the molecular weight of the polyetherimide is controlled by addition of an aromatic monoamine capping agent of molecular weight 93 to 250;

wherein said polyimide comprises less than 5 wt. % of impurities based on the weight of the polyimide, said impurities having a molecular weight of less than about 500 daltons and comprising structural units derived from at least one monomer unit or from at least one aromatic monoamine.

In another of its aspects the present invention comprises a polyimide composition comprising structural units of the formula

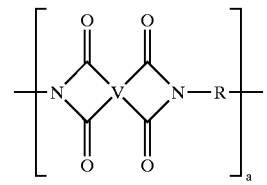

wherein "a" has a value of greater than 1, V is a tetravalent linker, and R is a substituted or unsubstituted divalent organic radical, said structural units being derived from an organic diamine monomer having a molecular weight from 100 to 500 and an aromatic dianhydride monomer with a molecular weight from 218 to 1000, said polyimide further comprising structural units derived from an aromatic monoamine capping agent of molecular weight 93 to 250;

wherein said polyimide comprises less than 5 wt. % of impurities based on the weight of the polyimide, said impurities having a molecular weight of less than about 500 daltons and comprising structural units derived from at least one monomer unit or from at least one aromatic monoamine.

DETAILED DESCRIPTION OF THE INVENTION

In one embodiment the present invention comprises polyimides having less than about 5 wt. % of low molecular weight impurities based on the weight of the polyimide composition. Said polyimides can be derived from the reaction of organic diamines, or chemically equivalent derivatives, with aromatic cyclic dianhydrides, aromatic tetracarboxylic acids, or their derivatives capable of forming cyclic anhydrides. Surprisingly, it has been found that the use of an aromatic monoamine to control molecular weight of the polyimide results in substantially less mold deposit than use of a mono functional anhydride to control molecular weight.

Useful polyimide resins comprise those with structural units of the general formula (I)

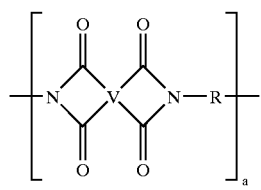

(I)

wherein "a" has a value of greater than 1, typically about 10 to about 1000 or more, and more preferably about 10 to about 500; V is a tetravalent linker without limitation, as long as the linker does not impede synthesis or use of the polyimide; and R is a substituted or unsubstituted divalent organic radical. Suitable linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Preferred linkers include but are not limited to tetravalent aromatic radicals of formulas (II), such as

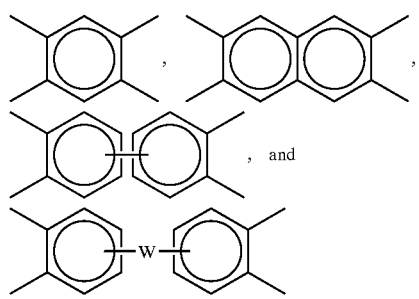

(II)

wherein W is a divalent moiety selected from the group consisting of —O—, —S—, —C(O)—, —SO$_2$—, C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions.

In some embodiments the moiety "Z" is a divalent aromatic group derived from a dihydroxy substituted aromatic hydrocarbon, and has the general formula (III):

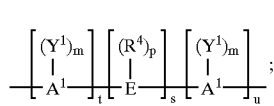

(III)

where "A$^1$" represents an aromatic group including, but not limited to, phenylene, biphenylene, naphthylene, etc. In some embodiments, "E" may be an alkylene or alkylidene group including, but not limited to, methylene, ethylene, ethylidene, propylene, propylidene, isopropylidene, butylene, butylidene, isobutylidene, amylene, amylidene, isoamylidene, etc.

In other embodiments, when "E" is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments, "E" may be a cycloaliphatic group non-limiting examples of which include cyclopentylidene, cyclohexylidene, 3,3,5-trimethylcyclohexylidene, methylcyclohexylidene, bicyclo[2.2.1]hept-2-ylidene, 1,7,7-trimethylbicyclo[2.2.1]hept-2-ylidene, isopropylidene, neopentylidene, cyclopentadecylidene, cyclododecylidene, and adamantylidene; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. R$^4$ independently at each occurrence represents a monovalent hydrocarbon group including, but not limited to, alkenyl, allyl, alkyl, aryl, aralkyl, alkaryl, or cycloalkyl. In various embodiments a monovalent hydrocarbon group of R$^4$ may be halogen-substituted, particularly fluoro- or chloro-substituted, for example as in dihaloalkylidene group of formula C=C(Z$^1$)$_2$, wherein each Z$^1$ is hydrogen, chlorine, or bromine, subject to the provision that at least one Z$^1$ is chlorine or bromine; and mixtures of the foregoing moieties. In a particular embodiment, the dihaloalkylidene group is a dichloroalkylidene, particularly gem-dichloroalkylidene group. Y$^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, OR$^5$ wherein R$^5$ is a monovalent hydrocarbon group including, but not limited to, alkyl, aryl, aralkyl, alkaryl, or cycloalkyl; it being only necessary that Y$^1$ be inert to and unaffected by the reactants and reaction conditions used to prepare the polymer. In some particular embodiments Y$^1$ comprises a halo group or C$_1$-C$_6$ alkyl group. The letter "m" represents any integer from and including zero through the number of positions on A$^1$ available for substitution; "p" represents an integer from and including zero through the number of positions on E available for substitution; "t" represents an integer equal to at least one; "s" represents an integer equal to either zero or one; and "u" represents any integer including zero.

When more than one Y$^1$ substituent is present in formula (III), they may be the same or different. The same holds true for the R$^1$ substituent. Where "s" is zero in formula (III) and "u" is not zero, the aromatic rings are directly joined by a covalent bond with no intervening alkylidene or other bridge. The positions of the oxygen groups and Y$^1$ on the aromatic nuclear residues A$^1$ can be varied in the ortho, meta, or para positions and the groupings can be in vicinal, asymmetrical or symmetrical relationship, where two or more ring carbon atoms of the hydrocarbon residue are substituted with $Y^1$ and oxygen groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of the moiety "Z", the moiety "E" may comprise an unsaturated alkylidene group. Suitable dihydroxy-substituted aromatic hydrocarbons from which "Z" may be derived in this case include those of the formula (IV):

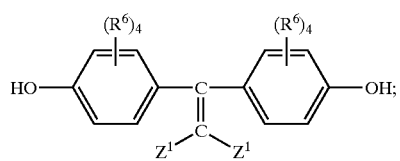

where each $R^6$ is independently hydrogen, chlorine, bromine, or a $C_{1-30}$ monovalent hydrocarbon or hydrocarbonoxy group, each $Z^1$ is hydrogen, chlorine or bromine, subject to the provision that at least one $Z^1$ is chlorine or bromine.

Examples of the moiety "Z" also include those derived from the dihydroxy-substituted aromatic hydrocarbons of the formula (V):

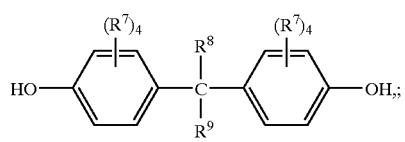

where each $R^7$ is independently hydrogen, chlorine, bromine, or a $C_{1-30}$ monovalent hydrocarbon or hydrocarbonoxy group, and $R^8$ and $R^9$ are independently hydrogen or a $C_{1-30}$ hydrocarbon group.

In various embodiments of the present invention the moiety "Z" may be derived from dihydroxy-substituted aromatic hydrocarbons disclosed by name or formula (generic or specific) in U.S. Pat. Nos. 2,991,273, 2,999,835, 3,028,365, 3,148,172, 3,271,367, and 3,271,368. In some embodiments of the invention, such dihydroxy-substituted aromatic hydrocarbons include bis(4-hydroxyphenyl) sulfide, 1,4-dihydroxybenzene, 4,4'-oxydiphenol, 2,2-bis(4-hydroxyphenyl)hexafluoropropane, and mixtures of the foregoing dihydroxy-substituted aromatic hydrocarbons. In other embodiments, such dihydroxy-substituted aromatic hydrocarbons include 4,4'-(3,3,5-trimethylcyclohexylidene) diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl) methane; bis(4-hydroxy-5-nitrophenyl)methane; bis(4-hydroxy-2,6-dimethyl-3-methoxyphenyl)methane; 1,1-bis (4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis-(3,5-dimethylphenyl-4-hydroxyphenyl) methane; 1,1-bis-(3,5-dimethylphenyl-4-hydroxyphenyl) ethane; 2,2-bis-(3,5-dimethylphenyl-4-hydroxyphenyl) propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)sulfide. In some embodiments aromatic dianhydride monomers further comprise functionality selected from the group consisting of ethers, alkoxys, aryloxys, sulfones, perfluoro alkyl groups and mixtures thereof. In a particular embodiment such a dihydroxy-substituted aromatic hydrocarbon comprises bisphenol-A.

In some embodiments "Z" may be derived from dihydroxy-substituted aromatic hydrocarbons wherein "E" is an alkylene or alkylidene group and part of one or more fused rings attached to one or more aromatic groups bearing one oxygen substituent. Suitable dihydroxy-substituted aromatic hydrocarbons of this type include those containing indane structural units such as 3-(4-hydroxyphenyl)-1,1,3-trimethylindan-5-ol and 1-(4-hydroxyphenyl)-1,3,3-trimethylindan-5-ol. Also included among suitable dihydroxy-substituted aromatic hydrocarbons of the type comprising one or more alkylene or alkylidene groups as part of fused rings are the 2,2,2',2'-tetrahydro-1,1'-spirobi [1H-indene]diols, illustrative examples of which include 2,2,2',2'-tetrahydro-3,3,3',3'-tetramethyl-1,1'-spirobi[1H-indene]-6,6'-diol (sometimes known as "SBI"). The structures —O—Z—O— derived from dihydroxy-substituted aromatic hydrocarbons may comprise mixtures of structural units derived from mixtures comprising any of the foregoing dihydroxy-substituted aromatic hydrocarbons.

In some particular embodiments Z includes, but is not limited, to divalent radicals of formula (VI).

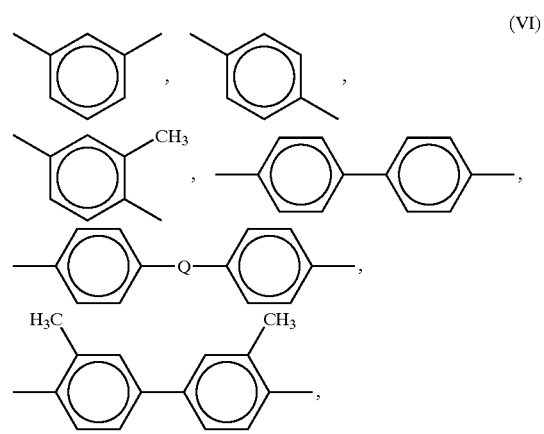

-continued

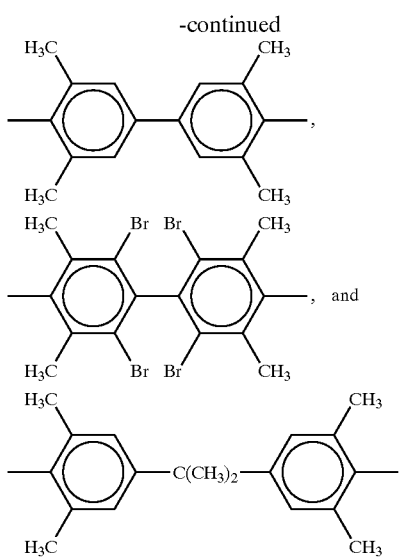
, and

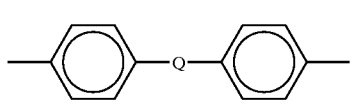

wherein Q includes but is not limited to a divalent moiety selected from the group consisting of —O—, —S—, —C(O)—, —SO$_2$—, C$_y$H$_{2y}$-(y being an integer from 1 to 5), and halogenated derivatives thereof, including perfluoroalkylene groups.

The moiety R in formula (I) includes but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (VII)

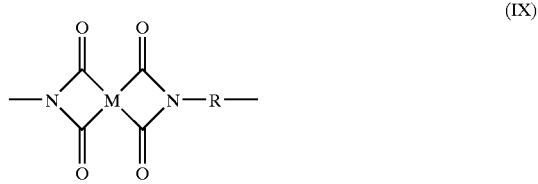

(VII)

wherein Q includes but is not limited to a divalent moiety selected from the group consisting of a covalent bond, —O—, —S—, —C(O)—, —SO$_2$—, C$_y$H$_{2y}$-(y being an integer from 1 to 5), and halogenated derivatives thereof, including perfluoroalkylene groups.

Preferred classes of polyimide polymers include poly (amide imide) polymers and polyetherimide polymers, particularly those polyetherimide polymers known in the art which are melt processable, such as those whose preparation and properties are described in U.S. Pat. Nos. 3,803,085 and 3,905,942. The most preferred polyimide resins are polyetherimides or copolymers comprising both polyimide and polyetherimide structural units.

It is often advantageous to use catalysts during the polymerization of polyimides. Examples of catalysts are the alkali metal salts of oxygenated compounds as described in U.S. Pat. No. 4,324,882, or alkali metal or zinc carboxylic acid salts as described in U.S. Pat. No. 4,293,683. Other catalysts may also be employed in effective amounts to facilitate imide formation. A preferred catalyst is sodium phenyl phosphinate also known as phenyl phosphinic acid, sodium salt. Catalyst levels can vary widely for example from 10–5000 ppm based on weight of the polymer.

Preferred polyetherimide resins comprise more than 1, typically about 10 to about 1000 or more, and more preferably about 10 to about 500 structural units, of the formula (VIII)

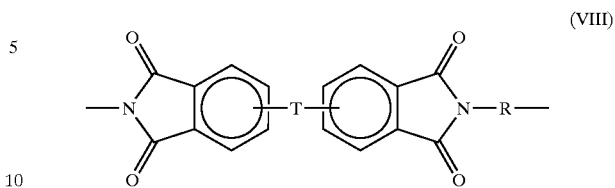

(VIII)

wherein T is —O— or a group of the formula —O—Z—O— wherein the divalent bonds of the —O— or the —O—Z—O— group are in the 3,3', 3,4', 4,3', or the 4,4' positions, and wherein Z is as defined above.

In one embodiment, the polyetherimide may be a copolymer, which, in addition to the etherimide units described above, further contains polyimide structural units of the formula (IX)

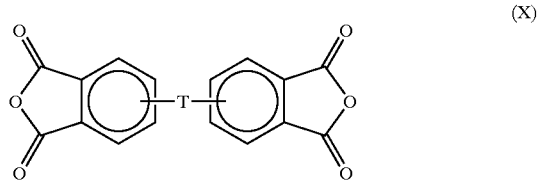

(IX)

wherein R is as previously defined for formula (I) and M includes, but is not limited to, radicals of formula (II), given hereinabove.

The polyetherimide can be prepared by any of the methods known to those skilled in the art, including the reaction of an aromatic bis(ether anhydride) monomer of the formula (X)

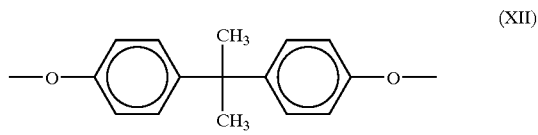

(X)

with an organic diamine monomer of the formula (XI)

H$_2$N—R—NH$_2$  (XI)

wherein T and R are defined as described above in formulas (VIII) and (I), respectively.

In a particularly preferred embodiment, the polyetherimide resin comprises structural units according to formula (VIII) wherein each R is independently p-phenylene or m-phenylene or a mixture thereof, and T is a divalent radical of the formula (XII)

(XII)

In particular embodiments, when the moiety "T" comprises formula (XII), the polyetherimide may comprise structural units selected from the group consisting of formulas (XIII), (XIV) and (XV):

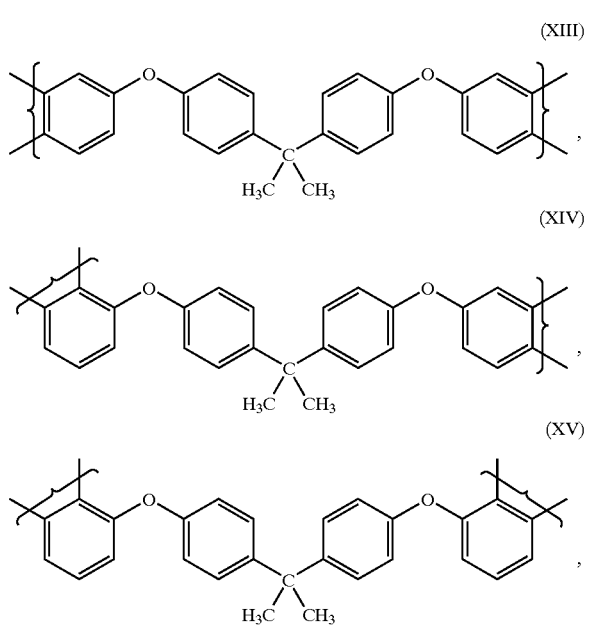

and mixtures thereof. Structural units of formulae (XIII)–(XV) are derived from the aromatic bis(ether anhydride)s 2,2-bis[4-(3,4-dicarboxyphenoxy)phenyl]propane dianhydride, the mixed dianhydride 2-[4-(3,4-dicarboxyphenoxy)phenyl]-2-[4-(2,3-dicarboxyphenoxy)phenyl]propane dianhydride, and 2,2-bis[4-(2,3-dicarboxyphenoxy)phenyl]propane dianhydride, respectively. Any mixture of the foregoing aromatic bis(ether anhydride)s can also be used. In one particular embodiment an aromatic bis(ether anhydride) composition comprising at least about 90 mole % 2,2-bis[4-(3,4-dicarboxyphenoxy)phenyl]propane dianhydride is employed in the synthesis of the polyetherimide composition. In another particular embodiment an aromatic bis(ether anhydride) composition comprising at least about 95 mole % 2,2-bis[4-(3,4-dicarboxyphenoxy)phenyl]propane dianhydride is employed in the synthesis of the polyetherimide composition, and sometimes hereinafter this particular aromatic bis(ether anhydride) composition is referred to as bisphenol-A dianhydride or "BPADA". These dianhydrides may be obtained from the reaction of bisphenol-A with a suitable phthalic anhydride derivative, such as for example, 4-chlorophthalic anhydride, 3-chlorophthalic anhydride, 4-nitrophthalic anhydride, 3-nitrophthalic anhydride, or mixtures thereof.

Included among the many methods of making the polyimides, particularly polyetherimide polymers, are those disclosed in U.S. Pat. Nos. 3,847,867, 3,814,869, 3,850,885, 3,852,242, 3,855,178, 3,983,093, and 4,443,591.

In some embodiments suitable organic diamines for synthesis of polyimides comprise aromatic diamines, illustrative examples of which include, but are not limited to, meta-phenylene diamine, para-phenylene diamine, 2,6-diethyl-4-methyl-1,3-phenylene diamine, 4,6-diethyl-2-methyl-1,3-phenylene diamine, 2,4-diaminotoluene, 2,6-diaminotoluene, 2,6-bis(mercaptomethyl)-4-methyl-1,3-phenylenediamine, 4,6-bis(mercaptomethyl)-2-methyl-1,3-phenylene diamine, bis(2-chloro-4-amino-3,5-diethylphenyl)methane, 4,4'-oxydianiline, 3,4'-oxydianiline, 3,3'-oxydianiline, 1,2-bis(4-aminophenyl)cyclobutene-3,4-dione, 1,3-bis(3-aminophenoxy)benzene, 1,3-bis(4-aminophenoxy)benzene, 1,4-bis(4-aminophenoxybenzene), 3,3'-diaminodiphenylsulfone, 4,4'-diaminodiphenylsulfone, bis(4-(4-aminophenoxy)phenyl)sulfone, bis(4-(3-aminophenoxy)phenyl)sulfone, 4,4'-bis(3-aminophenoxy)biphenyl, 4,4'-bis(4-aminophenoxy)biphenyl, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, 3,3'-diaminobenzophenone, 4,4'-diaminodiphenylmethane, 4,4'-diaminodiphenyl ether, 3,3'-diaminodiphenylmethane, benzidine, 3,3'-dimethylbenzidine, 3,3'-dimethoxybenzidine, 4,4'-diaminodiphenylsulfide, 2,2'-bis(4-aminophenyl)propane; bis(p-beta-methyl-o-aminophenyl) benzene; 1,3-diamino-4-isopropylbenzene; 1,2-bis(3-aminophenoxy)ethane; diaminobenzanilide, aminophenoxy biphenyl, bis(aminophenoxy)phenyl sulfone, bis aminophenoxy benzene, bis(p-beta-amino-t-butylphenyl)ether; 1,5-diaminonaphthalene; 2,4-bis(beta-amino-t-butyl)toluene; bis aminophenoxy fluorene, and m-xylylenediamine. Mixtures of the foregoing diamines can also be used. For example, the ETHACURE diamines, such as ETHACURE 100, which is a 80:20 weight ratio combination of 2,6-diethyl-4-methyl-1,3-phenylene diamine and 4,6-diethyl-2-methyl-1,3-phenylene diamine, respectively; and ETHACURE 300 which is a 80: 20 weight ratio combination of 2,6-bis(mercaptomethyl)-4-methyl-1,3-phenylenediamine and 4,6-bis(mercaptomethyl)-2-methyl-1,3-phenylene diamine, respectively, can also be used. In some embodiments the preferred diamino compounds are aromatic primary diamines free of benzylic hydrogens, especially m- and p-phenylenediamine, diaminodiphenyl sulfone and mixtures thereof. In some embodiments the organic diamines may comprise functionality selected from the group consisting of ethers, alkoxys, aryloxys, sulfones and perfluoro alkyl groups, and mixtures thereof. Examples of some specific aromatic bis(ether anhydride)s and aromatic diamines are disclosed, for example, in U.S. Pat. Nos. 3,972,902 and 4,455,410.

Illustrative, non-limiting examples of aromatic dianhydrides for synthesis of polyimides comprise diphenyl sulfone tetracarboxylic dianhydride, diphenyl sulfide tetracarboxylic dianhydride, hydroquinone diphthalic anhydride, resorcinol diphthalic anhydride, 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride, 4-(2,3-dicarboxyphenoxy)-4'-(3,4-dicarboxyphenoxy)diphenyl sulfone dianhydride, bisphenol-A dianhydride, benzophenone dianhydride, pyromellitic dianhydride, biphenylene dianhydride and oxydiphthalic anhydride, as well as various mixtures thereof. Most preferred dianhydrides are bisphenol-A dianhydride, benzophenone dianhydride, pyromellitic dianhydride, biphenylene dianhydride and oxydiphthalic anhydride.

Aromatic monoamines that can be used to end cap the polyimide are primary amines having typically from about 3 to about 24 ring carbon atoms and may include, but are not limited to, substituted or unsubstituted anilines, substituted or unsubstituted naphthyl amines and substituted or unsubstituted heteroaryl amines. These aromatic monoamines may have additional functionality bound to the aromatic ring including, but not limited to, aryl groups, alkyl groups, aryl-alky groups, sulfone groups, ester groups, amide groups, halogens, alkyl or aryl halogen groups, alkyl ether groups, aryl ether groups, or aryl keto groups. Some particular substituents on aromatic monoamines include, but are not limited to, halo and perfluoroalkyl. The attached functionality should not impede the function of the aromatic monoamine to act to control polyimide molecular weight.

The amount of aromatic monoamine employed to cap polyimides of the invention may be any amount that provides the desired molecular weight of the said polyimide. In some particular embodiments the amount of aromatic monoamine may be in a range of 0.1 to 15.0 mole % or in a range of 0.1 to 5.0 mole % based on the total amine content, wherein total amine content includes aromatic monoamine and also organic diamine.

Unless otherwise specified, the term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples C1–C32 alkyl optionally substituted with one or more groups selected from C1–C32 alkyl, C3–C15 cycloalkyl or aryl; and C3–C15 cycloalkyl optionally substituted with one or more groups selected from C1–C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include C6–C15 aryl optionally substituted with one or more groups selected from C1–C32 alkyl, C3–C15 cycloalkyl or aryl. Some particular illustrative examples of aryl radicals comprise substituted or unsubstituted phenyl, biphenyl, toluyl and naphthyl. Heteroaryl groups comprise those containing from about 3 to about 10 ring carbon atoms, and include, but are not limited to, triazinyl, pyrimidinyl, pyridinyl, furanyl, thiazolinyl and quinolinyl.

Low molecular weight impurities in polyimide compositions of the present invention comprise those species with a molecular weight of less than about 500 daltons comprising structural units derived from at least one monomer unit or from at least one aromatic monoamine or from both. Such impurities may comprise unreacted monomers or capping agent or both. Such impurities may also be derived from the reaction of one mole of dianhydride with one mole of organic diamine, or reaction of two moles of dianhydride with one mole of organic diamine, or reaction of one mole of dianhydride with two moles of organic diamine. Such impurities may also be derived from the reaction of one mole of dianhydride with one mole of aromatic monoamine, or reaction of one mole of dianhydride with two moles of aromatic monoamine. Such impurities may also comprise derivatives of the above mentioned impurities such as those comprising an amic acid moiety. In the present invention specified amounts of low molecular weight impurities in polyimide compositions are in a range of between about 0 wt. % and about 5 wt. % or between about 0.1 wt. % and about 4 wt. %, or between about 0.2 wt. % and about 3 wt. % or between about 0.3 wt. % and about 2 wt. %, or between about 0.3 wt. % and about 1.5 wt. %, based on the weight of the polyimide composition. In one particular embodiment low molecular weight impurities in polyimide compositions are present in an amount of less than 5 wt. % based on the weight of the polyimide composition. In another particular embodiment polyimide compositions are essentially free of low molecular weight impurities, meaning that the impurities may be present below the detection limit of commonly used analytical procedures.

Another aspect of the invention is a process to prepare a polyimide which comprises the step of reacting at least one aromatic diamine having a molecular weight of from 100 to 500 with at least one aromatic dianhydride with a molecular weight of from 218 to 1000, wherein the molecular weight of the polyimide is controlled by addition of at least one aromatic monoamine capping agent of molecular weight 93 to 250. In another aspect of the invention the aromatic diamine has a molecular weight of from 108 to 200 and the aromatic dianhydride has a molecular weight of from 300 to 700. Polyimides made where the aromatic diamine, the aromatic dianhydride and the aromatic monoamine capping agent are essentially free of benzylic protons may be preferred in some embodiments, especially those involving melt polymerization, due to the increased melt stability of the resultant polymer. In the present context essentially free of benzylic protons means that the polyimide product has less than 5 mole % of structural units, or less than 3 mole % structural units, or less than 1 mole % structural units derived from monomers and/or end cappers containing benzylic protons. In one particular embodiment essentially free of benzylic protons means that the polyimide product has zero mole % of structural units derived from monomers and/or end cappers containing benzylic protons.

In general, the polymerization reactions can be carried out employing well-known solvents, such as, but not limited to, o-dichlorobenzene, N-methyl pyrrolidinone, dimethyl sulfoxide, m-cresol/toluene and the like, to effect a reaction, for example, between a dianhydride of formula (X) and a diamine of formula (XI), at temperatures of about 100° C. to about 250° C. Alternatively, a polyetherimide can be prepared by melt polymerization of an aromatic bis(ether anhydride) (X) and a diamine (XI) by heating a mixture of the starting materials to elevated temperatures with concurrent stirring. Generally, melt polymerizations employ temperatures of about 200° C. to about 400° C. Branching agents may also be employed in the reaction. When polyetherimide/polyimide copolymers are employed, a dianhydride, such as pyromellitic dianhydride or oxydiphthalic anhydride, may be used in combination with the bis(ether anhydride). Polyetherimide resins can be prepared from reaction of an aromatic bis(ether anhydride) monomer with an organic diamine monomer wherein the two monomers are present in essentially equimolar amounts, or wherein one of the monomers is present in the reaction mixture at no more than about 0.2 molar excess, and preferably less than about 0.2 molar excess in relation to the other monomer; or wherein one of the monomers is present in the reaction mixture at no more than about 0.1 molar excess, and preferably less than about 0.1 molar excess in relation to the other monomer; or wherein one of the monomers is present in the reaction mixture at no more than about 0.05 molar excess, and preferably less than about 0.05 molar excess in relation to the other monomer; or wherein one of the monomers is present in the reaction mixture at no more than about 0.02 molar excess, and preferably less than about 0.02 molar excess in relation to the other monomer.

Generally, useful polyimide resins and especially polyetherimide resins have a melt index of about 0.1 to about 10 grams per minute (g/min), as measured by ASTM D1238 at 337° C., using a 6.6 kilogram (kg) weight. In a preferred embodiment, useful polyimide resins have a weight average molecular weight (Mw) of about 10,000 to about 150,000 grams per mole (g/mole), as measured by gel permeation chromatography, using a polystyrene standard. Preferred polyimide resins, and especially polyetherimide resins have a Mw from 10,000 to 60,000 g/mole. Such polyimide resins and especially polyetherimide resins typically have an intrinsic viscosity of greater than about 0.2 deciliters per gram (dl/g), and preferably about 0.35 to about 0.7 dl/g measured in chloroform or o-cresol at 25° C.

In the practice of the invention the aromatic monoamine chain-stopper can be incorporated into the polyimide reaction mixture in one portion or in incremental portions at any convenient time, for example, during polymerization or as part of the prepolymer prior to melt polymerization. In one procedure, for example, the aromatic dianhydride and organic diamine can be polymerized in the presence of the chain-stopper. In another procedure the chain-stopper can be incorporated into the prepolymer chain ends prior to melt polymerization. In a further procedure the chain-stopper can be added to the prepolymer prior to melt polymerization. In another embodiment aromatic monoamine chain-stopper and organic diamine monomer are intimately combined and added together to a reaction mixture comprising aromatic dianhydride. The aromatic monoamine chain-stopper and organic diamine monomer may be intimately combined using known methods, illustrative examples of which include combination through a static mixer or mixing in solvent. Known processes to prepare polyimides are included in the scope of this invention The polyimide resin of the invention may be further blended with reinforcements, fillers and colorants, as well as with other resins, to give compositions with low mold deposits. Reinforcing fiber and fillers may comprise from about 5 to about 50 weight percent and, preferably from about 10 to about 35 weight percent of the composition based on the total weight of the composition. The preferred reinforcing fibers are glass, ceramic, metal and carbon, and are generally well known in the art as are their methods of manufacture. In one embodiment, glass is preferred, especially glass that is relatively soda free. Fibrous glass filaments comprised of lime-alumino-borosilicate glass, which is also known as "E" glass, are often especially preferred. The filaments can be made by standard processes, e.g., by steam or air blowing, flame blowing and mechanical pulling. The preferred filaments for plastic reinforcement are made by mechanical pulling. For achieving optimal mechanical properties fiber diameters in the range of between 6 and 20 microns or between 10 and 15 microns are typically preferred. Although fibers with round cross sections are usually employed, fibers can also have non-round cross sections.

In preparing the molding compositions it is convenient to use the fiber in the form of chopped strands of from about 0.3175 centimeters (cm) to about 1.27 cm long although roving may also be used. In articles molded from the compositions, the fiber length is typically shorter presumably due to fiber fragmentation during compounding of the composition.

The fibers may optionally be treated with a variety of coupling agents to improve adhesion to the resin matrix. Preferred coupling agents include, but are not limited to, amino-, epoxy-, amide- or mercapto-functionalized silanes. Organometallic coupling agents, for example, titanium or zirconium based organometallic compounds, may also be used.

When fiber coatings are present, fiber coatings having a high thermal stability are often preferred to prevent decomposition of the coating, which could result in foaming or gas generation of the compositions during processing at the high melt temperatures required to form the resins of this invention into molded parts. Other fillers and reinforcing agents may be used alone or in combination with reinforcing fibers. These include, but are not limited to: carbon fibrils, conductive carbon, mica, talc, barite, calcium carbonate, wollastonite, milled glass, flaked glass, ground quartz, silica, zeolites, and solid or hollow glass beads or spheres.

The polyimide resins of the invention may be further blended with at least one other second resin to give compositions with low mold deposits. Examples of preferred second resins include, polycarbonates, polyester carbonates, polyarylates, polysulfones, polyphenylene ethers, polyesters, liquid crystal polyesters, polyamides, polyetherimides, polyetherether ketones, polyphenylene sulfides, polyolefins such as polyethylene and ethylene copolymers with acrylates and methacrylates, polyfluoro polyolefins such a polytetrafluoro ethylene, and silicones and silicone copolymers.

The second resin in the blend may be combined with the polyimide resin in amounts in a range of between about 0.3 wt. % and about 85 wt. % of the entire composition depending on the resin. In a more preferred embodiment the second resin in the blend is combined with the polyimide resin in an amount in a range of between about 10 wt. % and about 70 wt. % of the entire composition. The benefit of reduced mold deposit will generally be more noticeable in blends with higher polyimide content and especially with higher polyetherimide content.

The compositions of the invention can also be combined with various additives including, but not limited to, colorants such as titanium dioxide, zinc sulfide and carbon black; stabilizers such as hindered phenols, aryl phosphites, aryl phosphonites, inorganic halides and thioesters, as well as mold release agents, lubricants, flame retardants, smoke suppressors and anti-drip agents, for example, those based on fluoro polymers. Ultraviolet light stabilizers can also be added to the compositions in effective amounts.

The compositions of the present invention can be blended with the aforementioned ingredients by a variety of methods involving intimate admixing of the materials with any additional additives desired in the formulation. A preferred procedure includes melt blending, although solution blending is also possible. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment.

The temperature of the melt in the blending process is preferably minimized in order to avoid excessive degradation of the resins. It is often desirable to maintain a melt temperature between about 285° C. and about 370° C. in the molten resin composition, although higher temperatures can be used provided that the residence time of the resin in the processing equipment is kept short. In some embodiments the melt processed composition exits processing equipment such as an extruder through small exit holes in a die, and the resulting strands of the molten composition are cooled by passing the strands through a water bath. The cooled strands can be chopped into small pellets for packaging and further handling.

The compositions of the invention may be formed into shaped articles by a variety of common processes for shaping molten polymers such as injection molding, compression molding, extrusion and gas assist injection molding. Examples of such articles include, but are not limited to, electrical connectors, enclosures for electrical equipment, engine parts, automotive engine parts, lighting sockets and reflectors, electric motor parts, power distribution equipment, communication equipment and the like, including devices that have molded in snap fit connectors. The polyimide resins can also be made into film and sheet.

In many instances it is desirable to coat the article, or a portion of the article, with a metal surface. Such a coating may provide radio and electromagnetic wave shielding or reflectance. It may also provide the article with an electrically conductive pathway or surface. The coating may be of any metal; however, silver, copper, gold, nickel, aluminum, and chrome as well as alloys containing any of the foregoing are often preferred. The articles may have one or several metal coatings combining different metals or mixtures of metals. The metal surface may be applied by any technique known in the art, for example, by sputtering, vacuum deposition or electroless metallization.

It should be clear that thermoplastic compositions made by the process described herein are another embodiment of the present invention. It should also be clear that articles formed out of the thermoplastic compositions described herein are another embodiment of the present invention.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLE 1

Synthesis of low plate out PEI. Into a reaction vessel was charged 567 kg BPADA (approximate composition, 97.6 mole % BPADA, 2.4 mole % mono N-methyl imide of BPADA) and 1155 liters of o-dichlorobenzene (ODCB). The reaction mixture was heated to 150–160° C. Molten MPD (113.4 kg) at 140–150° C. was added over the course of 30 minutes. Simultaneously, 5.1 kg aniline was added. Both the aniline and MPD were pumped through a static mixer while being added to the BPADA. After the MPD addition was complete, the reaction mixture was heated to 180° C. with removal of water. The reaction mixture was moved to a hold tank kept at 170° C. and then fed into a solvent removal system. Solvent was removed using a wiped film evaporator reducing ODCB down to less than 500 ppm. The molten polymer was extruded into strands, cooled in a water bath and chopped to give finished pellets. The resultant polymer had a Mw of about 31,200 g/mole. Tg (glass transition temperature) as measured by differential scanning calorimetry (DSC) was 217° C.

EXAMPLE 2

Synthesis of low plate out PEI with stabilizers. Into a reaction vessel was charged 567 kg BPADA (approximate composition, 97.6 mole % BPADA, 2.4 mole % mono N-methyl imide of BPADA) and 1155 liters of o-dichlorobenzene (ODCB). The reaction mixture was heated 150–160° C. Molten MPD (113.4 kg) at 140–150° C. was added over the course of 30 minutes. Simultaneously, 5.1 kg aniline was added. Both the aniline and MPD were pumped through a static mixer while being added to the BPADA. After the MPD addition was complete, the reaction mixture was heated to 180° C. with removal of water. Once the imidization was essentially complete and no further water was evolved, 0.65 kg of a triaryl phosphite and 0.65 kg of a hindered phenol stabilizer were added. The reaction mixture was moved to a hold tank kept at 170° C., and then fed into a solvent removal system. Solvent was removed using a wiped film evaporator reducing ODCB down to less than 500 ppm. The molten polymer was extruded into strands, cooled in a water bath and chopped to give finished pellets. The resultant polymer had a Mw of about 31,200 g/mole. Tg as measured by DSC was 218° C.

COMPARATIVE EXAMPLE A

Synthesis of standard PEI with stabilizers. Into a reaction vessel was charged 552.7 kg BPADA (approximate composition, 97.6 mole % BPADA, 2.4 mole % mono N-methyl imide of BPADA), 8.12 kg of phthalic anhydride (PA) and 1155 liters of o-dichlorobenzene (ODCB). The reaction mixture was heated to 150–160° C. Molten MPD (116.3 kg) at 140–150° C. was added over the course of 30 minutes. After the MPD addition was complete, the reaction mixture was heated to 180° C. with removal of water. Once the imidization was essentially complete and no further water was evolved, 0.65 kg of a triaryl phosphite and 0.65 kg of a hindered phenol stabilizer were added. The reaction mixture was moved to a hold tank kept at 170° C. and then fed into a solvent removal system. Solvent was removed using a wiped film evaporator reducing ODCB down to less than 500 ppm. The molten polymer was extruded into strands, cooled in a water bath and chopped to give finished pellets. The resultant polymer had a Mw of about 31,200 g/mole. Tg as measured by DSC was 216° C.

Examples of the invention were made from BPADA and MPD with aniline capping. Example 1 had no phosphite or hindered phenol stabilizer added. Example 2 was capped with the same amount of aniline and the composition included 0.1% of hindered phenol, IRGANOX 1010 and 0.1 wt. % aryl phosphite, IRGAPHOS 168, both from the Ciba Geigy Co. Parts were molded on a 150 ton injection molding machine using a 10.2 cm×0.32 cm (4×⅛ inch) disk mold that was only half-filled. Partial filling of the part was used to accelerate the formation of mold deposit. After injection molding 200 partial shots (about 50 g) at a melt temperature of 400° C. and a mold temperature of 38° C., the deposit on the mold was carefully removed and weighed. Table 1 shows the type and weight of mold deposit. "C.Ex." indicates the comparative example.

TABLE 1

| | Example | | |
|---|---|---|---|
| | 1<br>Aniline capped<br>PEI<br>Unstabilized | 2<br>Aniline capped<br>PEI<br>Stabilized | C. Ex. A<br>PA-Capped<br>PEI<br>Stabilized |
| Amount of Mold Deposit (mg.) | 0.01 | 0.12 | 0.48 |
| Amount PAMI (mg.) | not detected | not detected | 0.38 |
| % Reduction in Mold Deposit | 98% | 75% | |

The aniline capped resins showed significantly less deposit on the mold after 200 shots than the phthalic anhydride capped comparative example. Compared to the phthalic anhydride capped comparative resin (comparative example A), mold deposit was reduced 75% for the stabilized aniline capped resin and 98% for the unstabilized aniline capped resin. Most of the mold deposit was PAMI.

PAMI (phenylenediamine bis-phthalimide), IRGAPHOS 168 (triaryl phosphite) and phosphite oxidation products were analyzed using high-temperature gas chromatography using an AGILENT 6890 Gas Chromatograph equipped with: autoinjector, oven capable of heating to 450° C., cool-on-column inlet with electronic pressure control and a flame-ionization detector with a 30 m×0.25 mm ultra-alloy stainless steel, capillary column with a UAC-DX30 0.15 μm film. Samples were dissolved in acetonitrile.

The portion of the mold deposit in the two stabilized blends (Example 2 and Comparative Example A) that was not PAMI, was identified by gas chromatography to be tris(di-tert-butyl phenyl)phosphite (IRGAPHOS 168 from Ciba Geigy Co.) and its oxidation products. While this specific stabilizer helps reduce color in the polymer, it also contributes to higher levels of plate out. A higher molecular weight phosphorus compound like, PEPQ, a phenyl phosphonite stabilizer from Clariant Co., may be preferred over the tris(di-tert-butyl phenyl)phosphite. Use of high molecular weight phosphorus based stabilizers in PEI resins is described in U.S. Pat. Nos. 4,508,861 and 6,001,957.

The stabilized resins of Example 2 and Comparative Example A were molded into lighting reflectors over about a 24 hr. period. Table 2 shows that with the standard phthalic anhydride-capped resin (Comparative Example A) the mold needed to be cleaned every 20 minutes. With the aniline capped resin (Example 2) mold cleaning was needed only every 6 hours. This is a 18 fold improvement.

TABLE 2

| | Time Between Mold Cleanings |
|---|---|
| Phthalic Anhydride Capped PEI | 0.33 hr |
| Aniline Capped PEI | 6.0 hr. |

The stabilized phthalic anhydride and aniline capped resins of Example 2 and Comparative Example A were separately melt blended with 1 wt. % titanium dioxide and 5 wt. % of an ethylene glycidyl methacrylate (PE-GMA) copolymer with 12 wt. % GMA sold by Sumitomo Co. as BONDFAST E. The resultant blends were molded into connectors over a long period of time. Table 3 shows that the blend made from the aniline capped resin required less mold cleaning than the blend made with the phthalic anhydride capped resin. In this case the time between mold cleaning due to plate out was increased by at least 16 hours in the composition comprising the aniline capped resin.

TABLE 3

| | Time Between Mold Cleanings |
|---|---|
| Phthalic Anhydride Capped PEI:PE-GMA Blend 95:5 | 12 hr. |
| Aniline Capped PEI:PE-GMA Blend 95:5 | >28 hr. |

EXAMPLE 4

An aniline capped polyetherimide was made using the following process. A round bottom flask equipped with a mechanical stirrer, a condenser and a Dean Stark trap, was charged with 137.6 g BPADA (approximate composition, 97.6 mole % BPADA, 2.4 mole % mono N-methyl imide of BPADA), 1.59 g of aniline, 27.5 g m-phenylene diamine and 285 ml of o-dichlorobenzene (ODCB). The reaction mixture was heated to 180° C. with removal of water. ODCB was distilled away with a nitrogen sweep and the molten polymer was transferred into a pan to cool. Tg as measured by differential scanning calorimetry (DSC) was 219° C. Mw was about 33,600.

EXAMPLE 5

Synthesis of PEI containing benzylic protons. A round bottom flask equipped with mechanical stirrer, a condenser and a Dean Stark trap, was charged with 137.6 g BPADA (approximate composition, 97.6 mole % BPADA, 2.4 mole % mono N-methyl imide of BPADA), 2.01 g of meta-toluidine (3-methyl aniline), 27.3 g m-phenylene diamine and 285 ml of o-dichlorobenzene (ODCB). The reaction mixture was heated to 180° C. with removal of water. ODCB was distilled away and the molten polymer was transferred into a pan to cool. Tg as measured by DSC was 215° C. Mw was about 29,000.

EXAMPLE 6

The procedure of Example 4 was repeated using 2.01 g para-toluidine (4-methyl aniline) in place of aniline to make another benzylic proton containing PEI. Tg was 218° C. Mw was about 31,100.

About 50 g of the polymers of Example 4, 5 and 6 were ground into a powder and individually heated in a HAAKE mixing bowl at 40 rpm. The polymer was heated for 4 min at 330° C. to remove any traces of solvent, and then heated to 380° C. at 3° C./min and held at temperature. Torque, measured in meter-grams (m-g) was recorded after 30, 60, 90 and 120 minutes total heating. Table 4 shows that the aniline capped resin (Example 4) shows only moderate increase in torque while the m- and p-toluidine capped resins, Examples 5 and 6, with benzylic protons, show a larger torque increase after heating at 380° C.

TABLE 4

| | Torque (m-g) | | | |
|---|---|---|---|---|
| | 30 min | 60 min | 90 min | 120 min |
| Ex. 4: Aniline capped | 126 | 200 | 246 | 278 |
| Ex. 5: m-Toluidine capped | 147 | 415 | 582 | 1003 |
| Ex. 6: p-Toluidine capped | 137 | 852 | 1269 | 1733 |

The aniline capped, non-benzylic proton containing resin (Example 4) has better melt stability. Reduced melt stability in Examples 5 and 6 makes it more difficult to melt process the benzylic proton-containing resins to shaped articles, if high temperature and extended time at temperature are needed in the processing equipment. While both the aniline- and toluidine-capped resins will reduce plate out, the aniline capped resin is preferred for its better melt stability.

EXAMPLE 7

Synthesis of PEI copolymer containing benzylic protons. A round bottom flask equipped with a mechanical stirrer, a condenser and a Dean Stark trap, was charged with 137.6 g BPADA (approximate composition, 97.6 mole % BPADA, 2.4 mole % mono N-methyl imide of BPADA), 1.59 g of aniline, 22.9 g m-phenylene diamine, 5.0 g 4,4'-methylene dianiline and 285 ml of o-dichlorobenzene (ODCB). The reaction mixture was heated to 180° C. with removal of water. ODCB was distilled away and the molten polymer was transferred into a pan to cool. Tg as measured by DSC was 216° C. Mw was about 30,000

About 50 g of the polymer of Example 7 was heated in a HAAKE mixing bowl at 40 rpm. The polymer was heated for 4 min at 330° C. to remove any traces of solvent, and then heated to 380° C. at 3° C./min and held at temperature. After 30 minutes heating, the polymer had a torque of 367 m-g; after 60 minutes heating torque increased to 1134 m-g; at 90 minutes torque rose to 1742 m-g and by 120 minutes heating torque increased to 2346 m-g. With only a small amount of methylene dianiline (MDA) units containing benzylic protons the polymer showed a much higher torque than the aniline capped resin with no benzylic protons (Example 4). While the aniline capped methylene dianiline-BPADA PEI copolymer will have reduced plate out, thermal melt stability is not as good as a resin with no benzylic protons.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents cited herein are incorporated herein by reference.

What is claimed is:

1. A process to prepare a polyimide comprising structural units of the formula

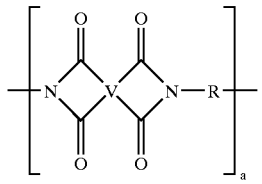

wherein "a" has a value of greater than 1, V is a tetravalent linker, and R is a substituted or unsubstituted divalent organic radical, which process comprises reacting an organic diamine monomer having a molecular weight from 100 to 500 with an aromatic dianhydride monomer with a molecular weight from 218 to 1000 wherein the molecular weight of the polyetherimide is controlled by addition of an aromatic monoamine capping agent of molecular weight 93 to 250;

wherein said polyimide comprises less than 5 wt. % of impurities based on the weight of the polyimide, said impurities having a molecular weight of less than about 500 daltons and comprising structural units derived from at least one monomer unit or from at least one aromatic monoamine.

2. The process of claim 1 wherein said impurities comprise the reaction product one mole of aromatic dianhydride monomer with two moles of aromatic monoamine.

3. The process of claim 1 wherein the organic diamine, the aromatic dianhydride and the aromatic monoamine capping agent are essentially free of benzylic protons.

4. The process of claim 1 wherein the polyimide is a polyetherimide.

5. The process of claim 4 wherein the polyetherimide has weight average molecular weight of from 10,000 to 60,000.

6. The process of claim 4 wherein the polytherimide has a glass transition temperature of greater than or equal to 200° C.

7. The process of claim 1 wherein the tetravalent linker comprises: (a) substituted or unsubstituted, saturated, unsaturated or aromatic monocyclic or polycyclic groups having about 5 to about 50 carbon atoms, (b) substituted or unsubstituted, linear or branched, saturated or unsaturated alkyl groups having 1 to about 30 carbon atoms; or combinations thereof.

8. The process of claim 1 wherein the tetravalent linker comprises structural units of the formulas selected from the group consisting of

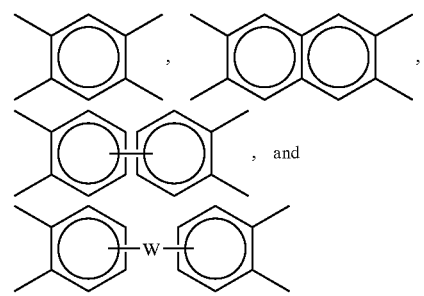

wherein W is a divalent moiety selected from the group consisting of —O—, —S—, —C(O)—, —SO$_2$-, C$_y$H$_{2y}$-(y being an integer from 1 to 5), and halogenated derivatives thereof, or a group of the formula —O—Z—O—wherein "Z" is a divalent aromatic group.

9. The process of claim 8 wherein "Z" has the formula:

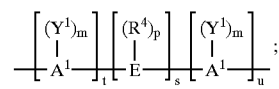

wherein A$^1$ is an aromatic group, E is an alkylene, an alkylidene, a cycloaliphatic group, a sulfur-containing linkage, a phosphorus-containing linkage; an ether linkage, a carbonyl group, a tertiary nitrogen group, or a silicon-containing linkage; Y$^1$ independently a each occurrence is selected from the group consisting of a monovalent hydrocarbon group, alkenyl, allyl, halogen, bromine, chlorine; and nitro; wherein "m" represents any integer from and including zero through the number of positions on A$^1$ available for substitution; R$^4$ independently at each occurrence is a monovalent hydrocarbon group, wherein "p" represents an integer from and including zero through the number of positions on E available for substitution; "t" represents an integer equal to at least one; "s" represents an integer equal to either zero or one; and "u" represents any integer including zero.

10. The process of claim 9 wherein "E" is a moiety selected from the group consisting of cyclopentylidene, cyclohexylidene, 3,3,5-trimethylcyclohexylidene, methylcyclohexylidene, neopentylidene, cyclododecylidene, adamantylidene, isopropylidene, bicyclo[2.2.1]hept-2-ylidene, 1,7,7-trimethylbicyclo[2.2.1]hept-2-ylidene, C=CZ$_2$, wherein each Z is hydrogen, chlorine, or bromine, subject to the provision that at least one Z is chlorine or bromine; and mixtures of the foregoing moieties.

11. The process of claim 1 wherein the moiety "V" comprises structural units selected from the group consisting of the formulas:

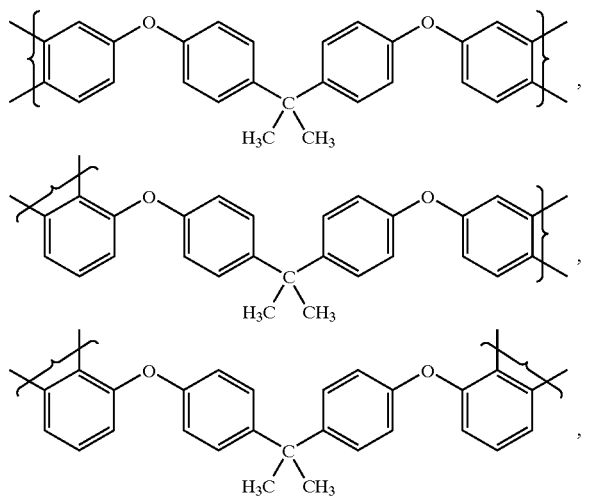

and mixtures thereof.

12. The process of claim 1 wherein the moiety R comprises at least one of: (a) aromatic hydrocarbon radicals having about 6 to about 20 carbon atoms or halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula

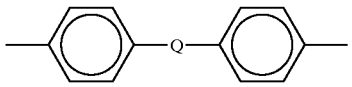

wherein Q comprises a divalent moiety selected from the group consisting of a covalent bond, —O—, —S—, —C(O)—, —SO$_2$—, C$_y$H$_{2y}$-, and halogenated derivatives thereof, wherein y is an integer from 1 to 5.

13. The process of claim 1 wherein the organic diamine comprises an aromatic hydrocarbon radical.

14. The process of claim 1 wherein the organic diamine is an aromatic diamine with a molecular weight from 108 to 200.

15. The process of claim 1 wherein the organic diamine further comprises functionality selected from the group consisting of ethers, alkoxys, aryloxys, sulfones, perfluoro alkyl groups, and mixtures thereof.

16. The process of claim 1 wherein the organic diamine is at least one diamine selected from the group consisting of meta-phenylene diamine, para-phenylene diamine, 4,4'-oxydianiline, 3,4'-oxydianiline, 3,3'-oxydianiline, 1,3-bis(3-aminophenoxy)benzene, 1,3-bis(4-aminophenoxy)benzene, 1,4-bis(4-aminophenoxybenzene), 3,3'-diaminodiphenylsulfone, 4,4'-diaminodiphenylsulfone, bis(4-(4-aminophenoxy)phenyl)sulfone, bis(4-(3-aminophenoxy)phenyl)sulfone, 4,4-bis(3-aminophenoxy)biphenyl, 4,4'-bis(4-aminophenoxy)biphenyl, 2,2'-bis(4-(4-aminophenoxy)phenyl)propane, 2,2-bis[4-(4-aminophenoxy)phenyl]hexafluropropane, 4,4'-bis(aminophenyl)hexafluoropropane, 3,3'- diaminobenzophenone, 4,4'-diaminodiphenyl ether, benzidine, 3,3'-dimethoxybenzidine, 4,4'-diaminodiphenylsulfide, 2,2'-bis(4-aminophenyl)propane, bis(aminophenoxy) fluorene, diaminobenzanilide and mixtures thereof.

17. The process of claim 1 wherein the aromatic dianhydride monomer has a molecular weight from 300 to 700.

18. The process of claim 1 wherein the aromatic dianhydride monomer further comprises functionality selected from the group consisting of ethers, alkoxys, aryloxys, sulfones, perfluoro alkyl groups and mixtures thereof.

19. The process of claim 1 wherein the aromatic dianhydride is at least one species selected from the group consisting of diphenyl sulfone tetracarboxylic dianhydride, dipbenyl sulfide tetracarboxylic dianhydride, hydroquinone diphthalic anhydride, resorcinol diphthalic anhydride, 2,2-bis(4-(3,4-dicarboxphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxphenoxy)-phenyl] propane dianhydride; 4,4'-bis(2,3-dicarboxyphenoxy) diphenyl ether dianhydride; 4,4'-bis(2,3-dicarboxyphenoxy) diphenyl sulfide diahydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy) diphenyl ether dianhydride, 4-(2,3-dicarboxyphenoxy)-4'-(3,4-dicarboxyphenoxy) diphenyl sulfide dianhydride; 4-(2, 3-dicarboxphenoxy)-4'-(3,4-dicarboxyphenoxy) benzophenone dianhydride, 4-(2,3- dicarboxphenoxy)-4'-(3, 4-dicarboxphenoxy)diphenyl sulfone dianhydride, bisphenol-A dianhydride, benzophenone dianhydride, pyromellitic dianhydride, biphenylene dianhydride, oxydiphthalic anhydride and mixtures thereof.

20. The process of claim 1 wherein the aromatic monoamine capping agent comprises about 3to about 24 ring carbon atoms.

21. The process of claim 1 wherein the aromatic monoamine is selected from the group consisting of: substituted and unsubstituted anilines, substituted and unsubstituted naphthyl amines, and substituted and unsubstituted heteroaryl amines, wherein substituents comprise aryl groups, alkyl groups, arylalkyl groups, sulfone groups, ester groups, amide groups, halogens, alkyl- or aryl-halogen groups, alkyl ether groups, aryl ether groups, or aryl keto groups bound to the aromatic ring.

22. The process of claim 1 wherein the aromatic monoamine is used in the process at a level of 0.1 to 15.0 mole % based on the total amine content.

23. The process of claim 1 wherein the aromatic monoamine and organic diamine monomer are intimately combined and added together to the reaction mixture comprising aromatic dianhydride.

24. A process to prepare a polyetherimide comprising structural units of the formula

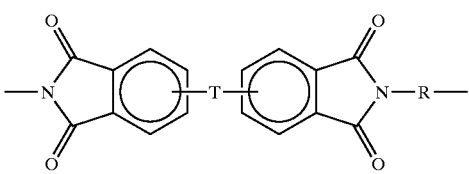

wherein T is —O— or a group of the formula —O—Z—O— wherein the divalent bonds of the —O— or the —O—Z—O— group are in the 3,3', 3,4', 4,3', or the 4,4' positions, and wherein Z is a divalent aromatic group selected from the group consisting of the formulas:

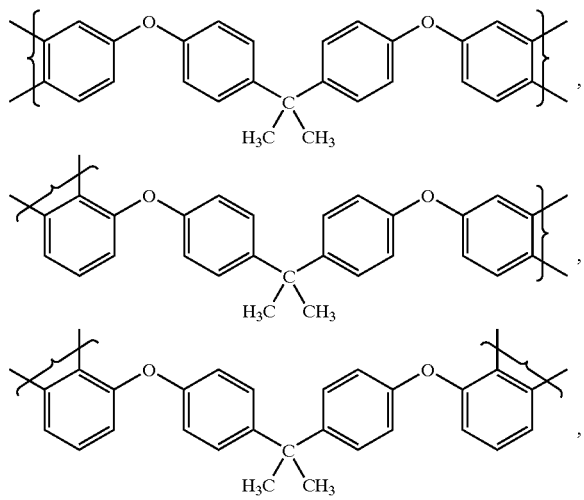

and mixtures thereof, which process comprises reacting an organic diamine monomer having a molecular weight from 100 to 500 with an aromatic dianhydride monomer, wherein the molecular weight of the polyetherimide is controlled by addition of an aromatic monoamine capping agent of molecular weight 93 to 250, wherein said polyetherimide comprises less than 5 wt. % of impurities based on the weight of the polyetherimide, said impurities having a molecular weight of less than about 500 daltons and comprising structural units derived from at least one monomer unit or from at least one aromatic monoamine.

25. The process of claim 24 wherein the aromatic monoamine and organic diamine monomer are intimately combined and added together to the reaction mixture comprising aromatic dianhydride.

26. A polyimide composition comprising structural units of the formula

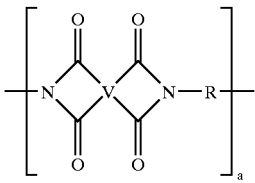

wherein "a" has a value of greater than 1, V is a tetravalent linker, and R is a substituted or unsubstituted divalent organic radical, said structural units being derived from an organic diamine monomer having a molecular weight from 100 to 500 and an aromatic dianhydride monomer with a molecular weight from 218 to 1000, said polyimide further comprising structural units derived from an aromatic monoamine capping agent of molecular weight 93 to 250;

wherein said polyimide comprises less than 5 wt. % of impurities based on the weight of the polyimide, said impurities having a molecular weight of less than about 500 daltons and comprising structural units derived from at least one monomer unit or from at least one aromatic monoamine.

27. The composition of claim 26 wherein said impurities comprise the reaction product one mole of aromatic dianhydride monomer with two moles of aromatic monoamine.

28. The composition of claim 26 wherein the organic diamine, the aromatic dianhydride and the aromatic monoamine capping agent are essentially free of benzylic protons.

29. The composition of claim 26 wherein the polyimide is a polyetherimide.

30. The composition of claim 29 wherein the polyetherimide has weight average molecular weight of from 10,000 to 60,000.

31. The composition of claim 29 wherein the polyetherimide has a glass transition temperature of greater than or equal to 200° C.

32. The composition of claim 26 wherein the tetravalent linker comprises (a) substituted or unsubstituted, saturated, unsaturated or aromatic monocyclic or polycyclic groups having about 5 to about 50 carbon atoms, (b) substituted or unsubstituted, linear or branched, saturated or unsaturated alkyl groups having 1 to about 30 carbon atoms; or combinations thereof.

33. The composition of claim 26 wherein the tetravalent linker comprises structural units of the formulas selected from the group consisting of

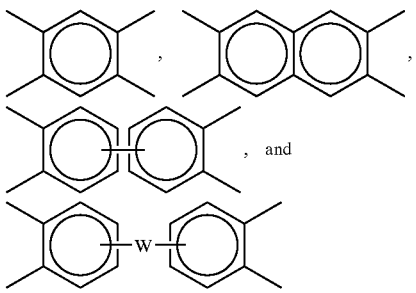

wherein W is a divalent moiety selected from the group consisting of —C—, —S—, —C(O)—, —SO$_2$-, C$_y$H$_{2y}$-(y being an integer from 1 to 5), and halogenated derivatives thereof, or a group of the formula —O—Z—O— wherein "Z" is a divalent aromatic group.

34. The composition of claim 33 wherein "Z" has the formula:

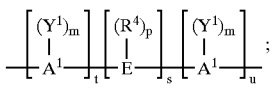

wherein A$^1$ is an aromatic group, E is an alkylene, an alkylidene, a cycloaliphatic group; a sulfur-containing linkage, a phosphorus-containing linkage; an ether linkage, a carbonyl group, a tertiary nitrogen group, or a silicon-containing linkage; $Y^1$ independently at each occurrence is selected from the group consisting of a monovalent hydrocarbon group, alkenyl, allyl, halogen, bromine, chlorine; and nitro; wherein "m" represents any integer from and including zero through the number of positions on $A^1$ available for substitution; $R^4$ independently at each occurrence is a monovalent hydrocarbon group, wherein "p" represents an integer from and including zero through the number of positions on E available for substitution; "t" represents an integer equal to at least one; "s" represents an integer equal to either zero or one; and "u" represents any integer including zero.

35. The composition of claim 34 wherein "E" is a moiety selected from the group consisting of cyclopentylidene, cyclohexylidene, 3,3,5-trimethylcyclohexylidene, methylcyclohexylidene, neopentylidene, cyclododecylidene, adamantylidene, isopropylidene, bicyclo[2.2.1]hept-2-ylidene, 1,7,7-trimethylbicyclo[2.2.1]hept-2-ylidene, C=CZ$_2$, wherein each Z is hydrogen, chlorine, or bromine, subject to the provision that at least one Z is chlorine or bromine; and mixtures of the foregoing moieties.

36. The composition of claim 26 wherein the moiety "V" comprises structural units selected from the group consisting of the formulas:

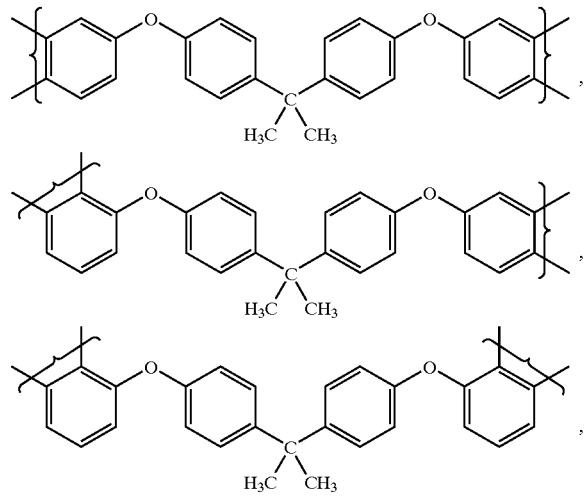

and mixtures thereof.

37. The composition of claim 26 wherein the moiety R comprises at least one of: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula

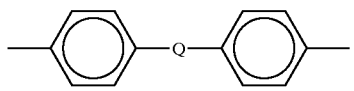

wherein Q comprises a divalent moiety selected from the group consisting of a covalent bond, —O—, —S—, —C(O)—, —SO$_2$—, C$_y$H$_{2y}$—, and halogenated derivatives thereof, wherein y is an integer from 1 to 5.

38. The composition of claim 26 wherein the organic diamine comprises an aromatic hydrocarbon radical.

39. The composition of claim 26 wherein the organic diamine is an aromatic diamine with a molecular weight from 108 to 200.

40. The composition of claim 26 wherein the organic diamine further comprises functionality selected from the group consisting of ethers, alkoxys, aryloxys, sulfones, perfluoro alkyl groups and mixtures thereof.

41. The composition of claim 26 wherein the organic diamine is at least one diamine selected from the group consisting of meta-phenylene diamine, para-phenylene diamine, 4,4'-oxydianiline, 3,4'-oxydianiline, 3,3'-oxydianiline, 1,3-bis(3-aminophenoxy)benzene, 1,3-bis(4-aminophenoxy)bezene, 1,4-bis(4-aminophenoxybenzene), 3,3'-diaminodiphenylsulfone, 4,4'-diaminodiphenylsulfone, bis(4-(4-aminophenoxy)phenyl)sulfone, bis(4-(3-aminophenoxy)phenyl)sulfone, 4,4'-bis(3-aminophenoxy)biphenyl, 4,4'-bis(4-aminophenoxy)biphenyl, 2,2'-bis(4-(4-aminophenoxy)phenyl)propane, 2,2-bis[4-(4-aminophenoxy)phenyl]hexafluoropropane, 4,4'-bis(aminophenyl)hexafluoropropane, 3,3'-diaminobenzophenone, 4,4'-diaminodiphenyl ether, benzidine, 3,3'-dimethoxybenzidine, 4,4'-diaminodiphenylsulfide, 2,2'-bis(4-aminophenyl)propane, bis(aminophenoxy) fluorene, diaminobenzanilide and mixtures thereof.

42. The composition of claim 26 wherein the aromatic dianhydride monomer has a molecular weight from 300 to 700.

43. The composition of claim 26 wherein the aromatic dianhydride monomer further comprises functionality selected from the group consisting of ethers, alkoxys, aryloxys, sulfones, perfluoro alkyl groups and mixtures thereof.

44. The composition of claim 26 wherein the aromatic dianhydride is at least one species selected from the group consisting of diphenyl sulfone tetracarboxylic dianhydride, diphenyl sulfide tetracarboxylic dianhydride, hydroquinone diphthalic anhydride, resorcinol diphthalic anhydride, 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4-bis(3,4-dicarboxyphenoxy)diphenyl sulfone dianhydride; 2,2-bis([4-(2,3-dicarboxyphenoxy)phenyl] propane dianhydride; 4,4'-bis(2,3-dicarboxyphenoxy) diphenyl ether dianhydride; 4,4'-bis(2,3-dicarboxyphenoxy) diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)-diphenyl-2, 2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride, 4-(2,3-dicarboxyphenoxy)-4'-(3,4-dicarboxyphenoxy)diphenyl sulfone dianhydride, bisphenol-A dianhydride, benzophenone dianhydride, pyromellitic dianhydride, biphenylene dianhydride, oxydiphthalic anhydride, and mixtures thereof.

45. The composition of claim 26 wherein the aromatic monoamine capping agent comprises about 3 to about 24 ring carbon atoms.

46. The composition of claim 26 wherein the aromatic monoamine is selected from the group consisting of: substituted and unsubstituted anilines, substituted and unsubstituted naphthyl amines, and substituted and unsubstituted heteroaryl amines, wherein substituents comprise aryl groups, alkyl groups, arylalkyl groups, sulfone groups, ester groups, amide groups, halogens, alkyl- or aryl-halogen groups, alkyl ether groups, aryl ether groups, or aryl keto groups bound to the aromatic ring.

47. The composition of claim 26 wherein the aromatic monoamine is used in the process at a level of 0.1 o 15.0 mole % based on the total amine content.

48. A polyetherimide comprising structural units of the formula

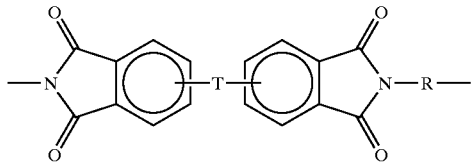

wherein T is —O— or a group of the formula —O—Z—O— wherein the divalent bonds of the —O— or the —O—Z—O— group are in the 3,3', 3,4', 4,3', or the 4,4' positions, and wherein Z is a divalent aromatic group selected from the group consisting of the formulas:

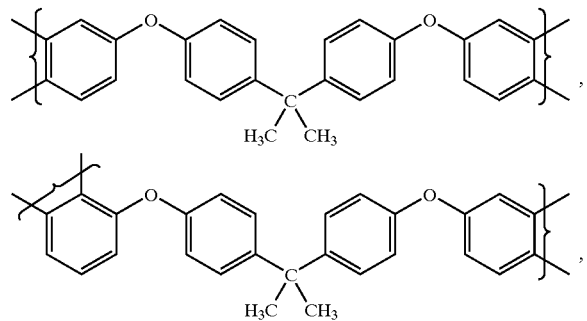

-continued

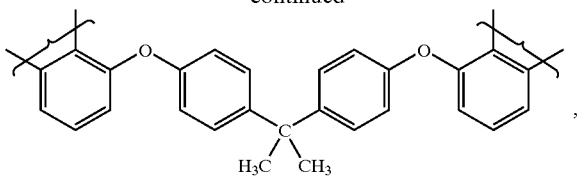

and mixtures thereof,
which comprises structural units derived from an organic diamine monomer having a molecular weight from 100 to 500 with an aromatic dianhydride monomer, wherein the molecular weight of the polyetherimide is controlled by addition of an aromatic monoamine capping agent of molecular weight 93 to 250,
wherein said polyetherimide comprises less than 5 wt. % of impurities based on the weight of the polyetherimide, said impurities having a molecular weight of less than about 500 daltons and comprising structural units derived from at least one monomer unit or from at least one aromatic monoamine.

49. An article comprising the composition claim 26.

50. The article of claim 49 wherein the article is metallized with a reflective coating.

51. The article of claim 49 wherein the article is a selected from the group consisting of: reflectors, connectors, films, sheets, cookware, helmets, medical devices, pumps, trays, food containers, handles, gears, computer parts, appliances, engine components and automotive parts.

52. An article comprising the composition of claim 48.

53. The article of claim 52 wherein the article is metallized with a reflective coating.

54. The article of claim 52 wherein the article is a selected from the group consisting of: reflectors, connectors, films, sheets, cookware, helmets, medical devices, pumps, trays, food containers, handles, gears, computer parts, appliances, engine components and automotive parts.

* * * * *